United States Patent [19]
Eidelberg

[11] 3,829,136
[45] Aug. 13, 1974

[54] SLIP-FIT ELECTRICAL COUPLING
[75] Inventor: Jonah Eidelberg, Huntington Station, N.Y.
[73] Assignee: Electrical Fittings Corporation, East Farmingdale, N.Y.
[22] Filed: Oct. 6, 1972
[21] Appl. No.: 295,701

Related U.S. Application Data
[62] Division of Ser. No. 66,408, Aug. 24, 1970, Pat. No. 3,703,303.

[52] U.S. Cl................. 285/383, 285/404, 285/417
[51] Int. Cl............................................. F16l 21/06
[58] Field of Search ........ 285/317, 344, 383, 382.7, 285/404, 417; 174/845, 945; 403/292, 293, 298

[56] References Cited
UNITED STATES PATENTS

| | | | |
|---|---|---|---|
| 1,851,143 | 3/1932 | Wilson | 285/383 X |
| 2,027,824 | 1/1936 | Hunt | 285/383 X |
| 2,597,482 | 5/1952 | Harrison et al. | 285/383 X |
| 2,755,111 | 7/1956 | Newell et al. | 285/383 X |
| 3,139,480 | 6/1964 | Deslodge | 285/404 X |
| 3,355,201 | 11/1967 | Barwick | 285/404 X |
| 3,735,928 | 5/1973 | Watts et al. | 285/404 X |

*Primary Examiner*—Werner H. Schroeder
*Attorney, Agent, or Firm*—Howard C. Miskin

[57] ABSTRACT

An electrical coupling for attachment to a pair of rigid conduits in a confined space includes a sleeve member which slidably receives the conduit, and further includes a stop member centrally disposed on the sleeve for movement into and out of the bore of the sleeve for providing a stop when extending into the bore, and for allowing the sleeve to be slipped back onto either conduit when the screw is removed from the bore of the sleeve.

8 Claims, 7 Drawing Figures

PATENTED AUG 13 1974　　　　　　　　　　　　　　　　　3,829,136
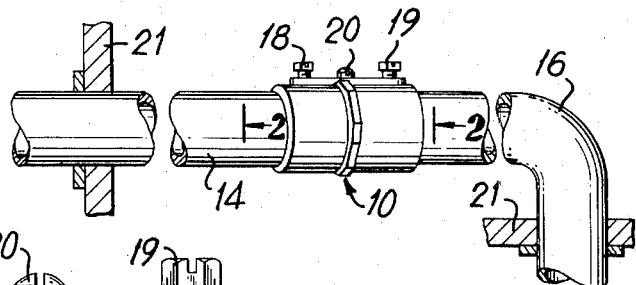
FIG. 1
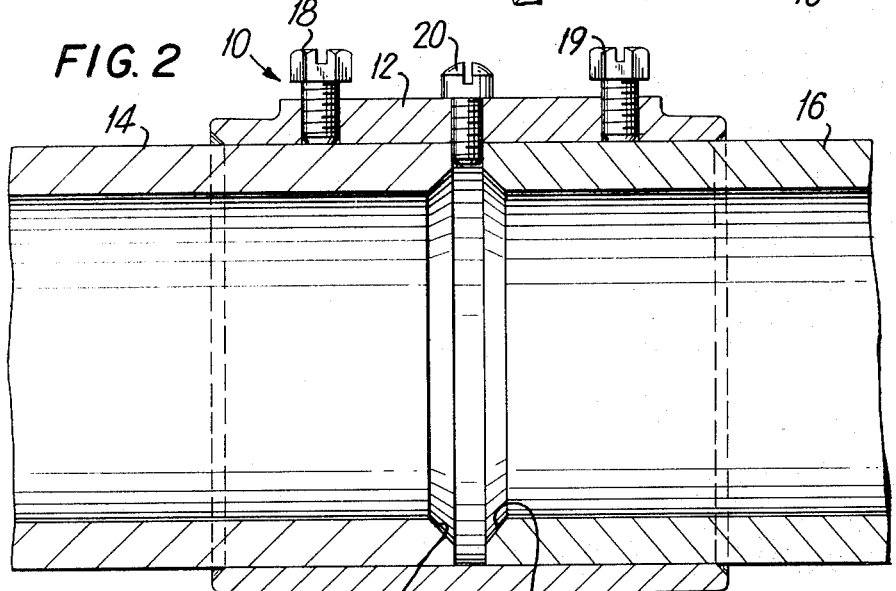
FIG. 2
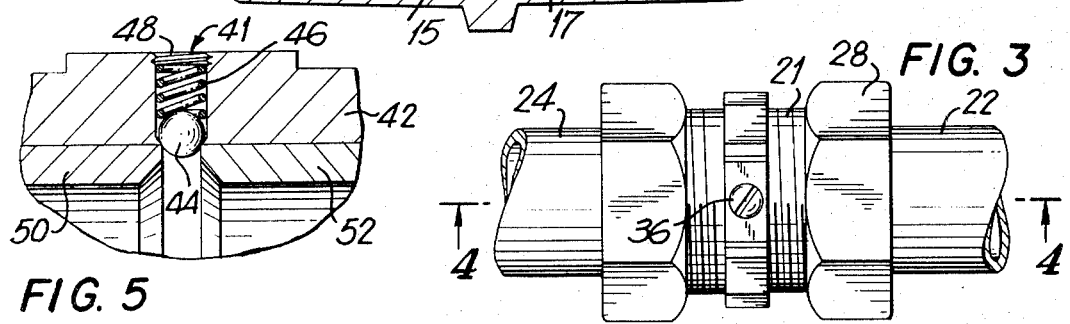
FIG. 5　　FIG. 4　　FIG. 3
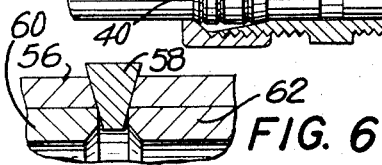
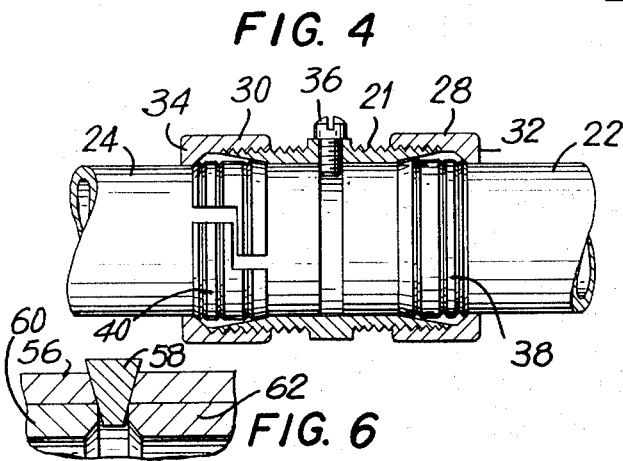
FIG. 6
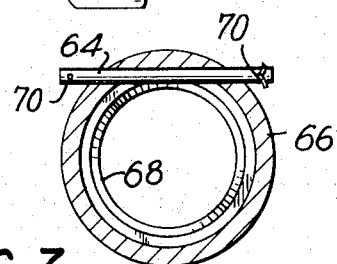
FIG. 7

SLIP-FIT ELECTRICAL COUPLING

This is a division of application Ser. No. 66,408, filed Oct. 24, 1970, now U.S. Pat. No. 3,703,303.

This invention relates to an electrical coupling or a connector for attachment to electrical cable conduit, and in particular for a coupling used in attaching a pair of rigid conduits in a confined space where there is substantially no "play" in the conduit, and allowing opening of the connection without removing, cutting, bending or deforming the installation.

Heretofore, when rigid conduit was installed in a confined space, which allowed no "play" in the conduit, i.e., no movement of the conduit, it was difficult to install, or if necessary, to reopen the connection and replace a section of conduit, or to gain entrance to the conduit. As acquired by the appropriate industry standards, couplings required some type of center stop to insure that each section or length of the conduit abutted the stop to insure good attachment between a corresponding section of conduit and the coupling. Such stops were inwardly directed, fixed radial ribs. Fixed rigid conduits were difficult to install with such a connector or coupling, and if it became necessary to open the conduit and remove the coupling, the conduit was forced to be cut or bent to allow sufficient space between the ends of the conduit to remove the coupling. Various proposals were made to overcome this inherent difficulty by using multiple piece couplings, which markedly increased its cost and the cost of assembly and installation and required threading of conduit.

Therefore, it is a principle object of the present invention to provide a coupling for electrical conduits for extremely tight installations, which is simple to use, and which provides a moveable centering stop for the conduit, and allows easy and quick assembly, and removal without cutting or deforming the conduit or removing the various sections of the conduit.

It is a further object of the present invention to provide a coupling for electrical conduits, which can be attached to the conduits by various means.

Another object of the present invention is to provide an electrical coupling for conduit, having a moveable stop member, which is inexpensive to produce, and provides flexibility in use.

Further objects and advantages will become apparent from the following description of the invention taken in conjunction with the following figures, in which:

FIG. 1 is a general perspective view of a coupling in accordance with the present invention, mounted on a rigid conduit;

FIG. 2 is an enlarged cross-sectional view taken along line 2—2 of FIG. 1;

FIG. 3 is a front elevational view of a further embodiment of the present invention, mounted on a rigid conduit;

FIG. 4 is a cross-sectional view taken along line 4—4 of FIG. 3;

FIG. 5 is a fragmentary view of the sleeve showing another moveable stop member;

FIG. 6 is a fragmentary view of a sleeve showing still another embodiment; and

FIG. 7 is a cross-sectional view of a sleeve showing a still further embodiment of a moveable stop member.

In the form of the invention shown in FIGS. 1 and 2, an electrical coupling 10 incorporating the invention has a hollow tubular sleeve or fitting 12 for connecting a pair of conduits 14 and 16 at opposite open ends. Sleeve 12 has a bore between its ends. As shown, the facing ends of conduits 14 and 16 are bevelled as indicated at 15 and 17, respectively. Mounted on sleeve 12 to cooperate with conduits 14 and 16 are a pair of set screws 18 and 19, which as illustrated are slotted hex head screws. Screws 18 and 19 can be threaded into and out of the bore of sleeve 12. Similarly, generally centrally mounted on sleeve 12 is a stop member, shown as a set screw 20, for movement into and out of the bore of sleeve 12. As shown, screw 20 has a fillister head.

In use, screws 18, 19 and 20 are threaded to their outward position so as not to extend into the bore of sleeve 12. Sleeve 12 is then slidably slipped on one of the conduits, such as conduit 14 and the second conduit 16 is positioned so its facing end is closely spaced with respect to the end of the conduit 14. As is evident from FIG. 1, the conduit being coupled can just fit the available space with no rotation of the conduit necessary. The conduits are shown immoveable, passing through walls 21. The present coupling allows easy assembly. Coupling 10 is then slipped back on conduit 14, so as to overlap the ends of conduits 14 and 16. Centering screw 20 is then threaded so as to extend into the bore of sleeve 12, and the lead or facing ends of conduit 14 and 16 engage the body of screw 20, as illustrated in FIG. 2. Coupling 10 is secured to conduits 14 and 16 by tightening set screws 18 and 19. Additional screws 18 and 19 may be radially positioned about the circumference of sleeve 12, so as to provide a uniform clamping action on the conduits and to withstand the necessary pull out requirements.

With the facing ends of the clamped conduit in close abutting relation and the rigid conduit fixed during installation, with the present invention it is a relatively simple matter to remove the coupling if need arises without disturbing the conduit. To accomplish this, the various set screws 18, 19 and 20 are unthreaded from the bore of the sleeve, the sleeve 12 is slid entirely onto either conduit 14 or 16, and the cable contained within the conduits is accessible. There is no need to bend or deform the conduit or even remove one section as heretofore required with prior art connectors or couplings. The coupling can be quickly reconnected.

In the embodiment shown in FIGS. 3 and 4, sleeve 21 is shown mounted on rigid conduits 22 and 24 in a manner generally similar to that described above. Nuts 28 and 30 are threadedly mounted about opposite ends of sleeve 21, which nuts contain radially extending tapered ends 32 and 34, respectively. Centrally mounted on sleeve 21 is set screw 36, which can be threaded into and out of the bore of sleeve 21. Mounted within nuts 28 and 30 are compression rings 38 and 40, respectively, which fit about the outer peripheral surface of the corresponding conduit 22 and 24, respectively. The coupling illustrated in FIGS. 3 and 4 is used in a manner generally similar to that described above in centering the facing ends of conduit 22 and 24 within sleeve 21 when nuts 28 and 30 are tightened onto sleeve 21 by compression rings 38 and 40, respectively.

Another embodiment of the stop member is shown in FIG. 5, where a detent unit 41 is threaded into the central portion of sleeve 42. Sleeve 42 has a threaded opening to receive unit 40 and swaged to prevent ball 44 from passing through, but yet extend into the bore of sleeve 42. Ball 44 is resiliently held in the bore by a spring 46, which in turn is held in the opening by a nut 48. In use, conduit 50 is inserted in one end of the sleeve and the sleeve slid onto the conduit by overcoming the force of spring 46. Conduit 52 is then positioned adjacent but slightly spaced from conduit 50. Sleeve 42 moved back onto conduit 52 and ball 44 pops downwardly between the facing ends of the conduits and the sleeve affixed to the conduits, such as discussed above. The noise of movement of the ball signals the user that the sleeve is properly positioned and ready to be assembled.

Another embodiment of the stop member is illustrated in FIG. 6, where sleeve 56 has an opening, shown as tapered, which matingly receives a tapered rod 58 which extends slightly into the bore of sleeve 56, between the facing ends of conduits 60 and 62.

A still further embodiment is illustrated in FIG. 7, where a pin or rod 64 is moved transversely into and out of a transverse opening in sleeve 66 and communicating with the bore of sleeve 66 to engage or abut the end of conduit 68. To prevent accidental displacement of rod 64, cotter pins or pivoting pins could be positioned in the openings 70 in rod 64.

In electrical installation, positive bite electrical ground continuity is made by a set screw clamping against the conduit, which as illustrated in FIG. 1 is achieved. Advantageously, the length of the stop member is such that when it is fully positioned into the bore of its corresponding sleeve, it does not extend beyond the conduit walls into the bore of the conduits. This eliminates the possibility that the screw may abraid or contact the electrical couplings or cables contained within the conduit.

While various embodiments of the stop or centering member were shown, other constructions can be used.

Where used in the specification and claims, the term "rigid" is used in its broad meaning and is meant "unyielding or stiff, or not easily bent," and is not meant to indicate a special type of conduit.

While there has been described and illustrated preferred embodiments of the present invention, it is apparent that numerous alterations, omissions and additions may be made without departing from the spirit thereof.

What is claimed is:

1. An electrical coupling for attachment to facing sections of conduit carrying cable, which conduit sections have a bore and a wall, comprising a tubular sleeve having a wall with opposite ends open and a bore therebetween for receiving corresponding ends of said facing conduit sections, said sleeve wall having an opening generally centrally positioned intermediate its ends and communicating with said bore, the axis of said opening lying in a plane parallel to the axis of said sleeve and forming a chord of said bore, a conduit centering member removable mounted within said sleeve opening and movable into and out of said sleeve bore, and means mounted on said sleeve for removably clamping said sleeve to the corresponding ends of said conduit sections.

2. A coupling as in claim 1, wherein said moveable member is a screw.

3. A coupling as in claim 1 wherein said clamping means are screws mounted on corresponding ends of said sleeve.

4. A coupling as in claim 1, wherein said clamping means are compression rings mounted on opposite ends of said sleeve.

5. A coupling as in claim 4, wherein said outer surface of said sleeve is threaded.

6. A coupling as in claim 1, wherein said centering member is a tapered rod.

7. A coupling as in claim 1 wherein said centering member extends into the sleeve bore to a distance not greater than the inner diameter of a conduit section positioned within said sleeve so as to engage an end of the conduit wall and not to extend into the conduit bore.

8. A coupling as in claim 2 wherein said opening is threaded.

* * * * *